(12) United States Patent
Yudkovitz et al.

(10) Patent No.: US 9,080,551 B2
(45) Date of Patent: Jul. 14, 2015

(54) SYSTEM FOR GENERATING ELECTRICAL POWER FROM AIRCRAFT EXHAUST

(71) Applicants: Alexander Jay Yudkovitz, New Canaan, CT (US); Sheran Ranchith Perera, Rockville, MD (US); Paul Roche Bartholomew, Leesburg, VA (US); Samuel David Faggert, Montpelier, VA (US); Michael Andrew Cwietniewicz, Lincoln University, PA (US)

(72) Inventors: Alexander Jay Yudkovitz, New Canaan, CT (US); Sheran Ranchith Perera, Rockville, MD (US); Paul Roche Bartholomew, Leesburg, VA (US); Samuel David Faggert, Montpelier, VA (US); Michael Andrew Cwietniewicz, Lincoln University, PA (US)

(*) Notice: Subject to any disclaimer, the term of this patent is extended or adjusted under 35 U.S.C. 154(b) by 0 days.

(21) Appl. No.: 13/758,850

(22) Filed: Feb. 4, 2013

(65) Prior Publication Data
US 2013/0341932 A1    Dec. 26, 2013

Related U.S. Application Data

(60) Provisional application No. 61/664,169, filed on Jun. 26, 2012.

(51) Int. Cl.
*F03D 9/00* (2006.01)
*F03D 1/06* (2006.01)

(52) U.S. Cl.
CPC .............. *F03D 9/002* (2013.01); *F03D 1/0608* (2013.01); *F05B 2240/243* (2013.01); *Y02B 10/30* (2013.01); *Y02E 10/721* (2013.01); *Y02E 10/725* (2013.01); *Y02E 10/74* (2013.01)

(58) Field of Classification Search
CPC ......... Y02E 10/74; Y02E 10/47; F03D 11/04; F03D 3/002; F03D 11/0008; F03D 9/002; F05B 2240/221; F05B 2260/79; H02K 7/088; Y02B 10/30
USPC ............. 290/55; 415/4.3, 4.5, 71–72, 74, 908
See application file for complete search history.

(56) References Cited

U.S. PATENT DOCUMENTS

| | | | | |
|---|---|---|---|---|
| 4,303,835 | A * | 12/1981 | Bair | 290/55 |
| 5,998,882 | A * | 12/1999 | Alston | 290/54 |
| 7,132,760 | B2 * | 11/2006 | Becker | 290/55 |
| 7,380,751 | B1 * | 6/2008 | Henson | 244/114 B |
| 7,494,315 | B2 * | 2/2009 | Hart | 415/4.2 |
| 7,793,886 | B2 * | 9/2010 | Henson, III | 244/114 B |
| 2008/0042446 | A1 * | 2/2008 | Kurtz | 290/55 |
| 2009/0015019 | A1 * | 1/2009 | Donaghey | 290/55 |
| 2009/0110554 | A1 * | 4/2009 | Dukovic et al. | 416/41 |
| 2009/0115193 | A1 * | 5/2009 | Branco | 290/54 |
| 2009/0250936 | A1 * | 10/2009 | Souryal | 290/55 |
| 2010/0090469 | A1 * | 4/2010 | Sullivan | 290/55 |

\* cited by examiner

*Primary Examiner* — Michael Zarroli

(57) ABSTRACT

An energy generation system works to convert wind created by aircraft exhaust into electrical power. The system uses a wind turbine including a plurality of blades extending from a shaft with a generator coupled to the shaft. The wind turbine is placed behind a runway to collect the wind from the engine of an aircraft, generating energy and converting the energy into electricity.

7 Claims, 1 Drawing Sheet

SYSTEM FOR GENERATING ELECTRICAL POWER FROM AIRCRAFT EXHAUST

CROSS-REFERENCE TO RELATED APPLICATION

This application claims the benefit of priority of U.S. provisional application No. 61/664,169, filed Jun. 26, 2012, the contents of which are herein incorporated by reference.

BACKGROUND OF THE INVENTION

The present invention relates to a system for generating electrical power and, more particularly, to a system for converting wind created by aircraft exhaust into electrical power.

During takeoff, aircrafts exhaust a lot of wind. The wind is typically dissipated into blast fences. Unfortunately, the blast fences dissipate the wind, but do not collect any energy from the wind, which results in the wasting of energy.

Regular wind turbines cannot be used for collecting aircraft generated wind because conventional three-blade windmills would interfere with air traffic.

As can be seen, there is a need for a system that helps in converting the wind created by aircraft exhaust into electrical power.

SUMMARY OF THE INVENTION

In one aspect of the present invention, a system for generation of electricity comprises a shaft, the shaft aligned parallel to a longitudinal axis of an aircraft runway; a plurality of blades extending from the shaft; and a generator mechanically coupled to the shaft, wherein turning of the shaft turns the generator to generate electricity.

In another aspect of the present invention, a system for generating electrical power from exhaust wind of an airplane during takeoff comprises a plurality of rotatably supported blades disposed around a shaft; a first rotational bearing attached to a first end of the shaft; a second rotational bearing attached to a second end of the shaft; a generator connected to the shaft; a first mounting device connected to a second end of the shaft; a second mounting device connected to a first end of the shaft; and a bracket connected to the first and second mounting devices, wherein the brackets are designed to be secured to a blast pad of a runway threshold.

In a further aspect of the present invention, a method for generating electricity comprises disposing a wind-driven rotation device on a blast pad of a runway threshold; receiving wind from aircraft exhaust during takeoff on a runway; turning blades extending from a shaft of the wind-driven rotation device; and supplying rotational energy of the shaft to a generator to generate electricity.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system that works to convert wind created by aircraft exhaust into electrical power. The system uses a modified version of an Archimedes screw-shaped wind turbine placed behind a runway to collect the energy, currently wasted, from the aircraft and convert it to usable electricity.

Figure 1:
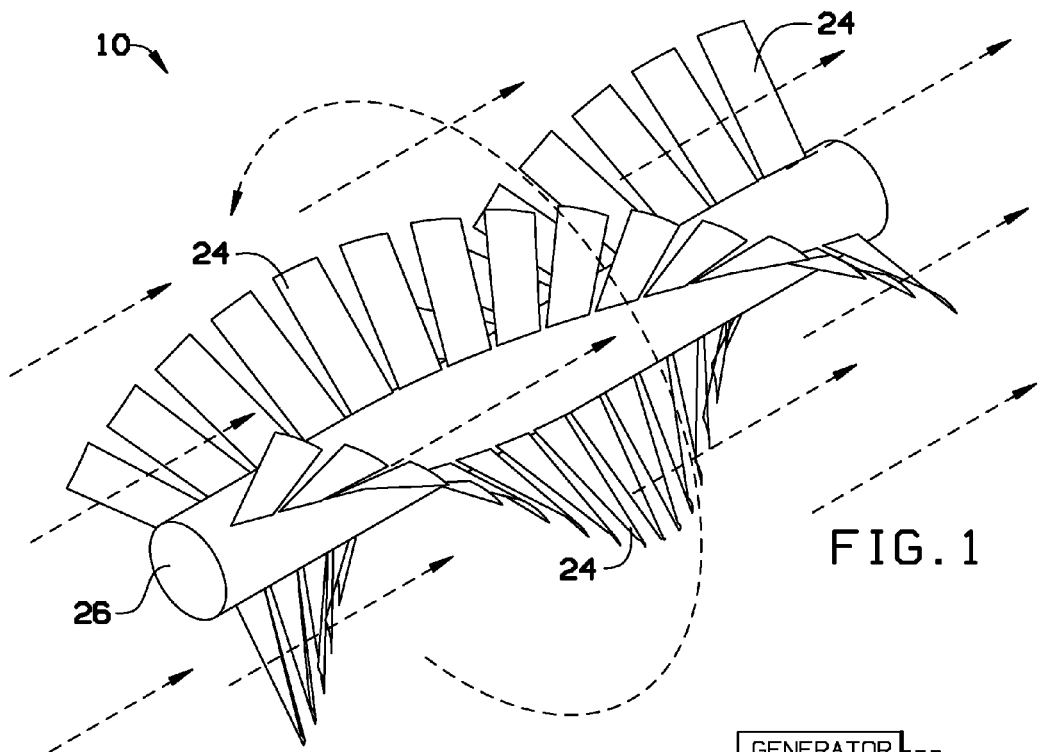
FIG. 1 is a perspective front view of a system for generating electrical power according to an exemplary embodiment of the present invention.
Figure 2:
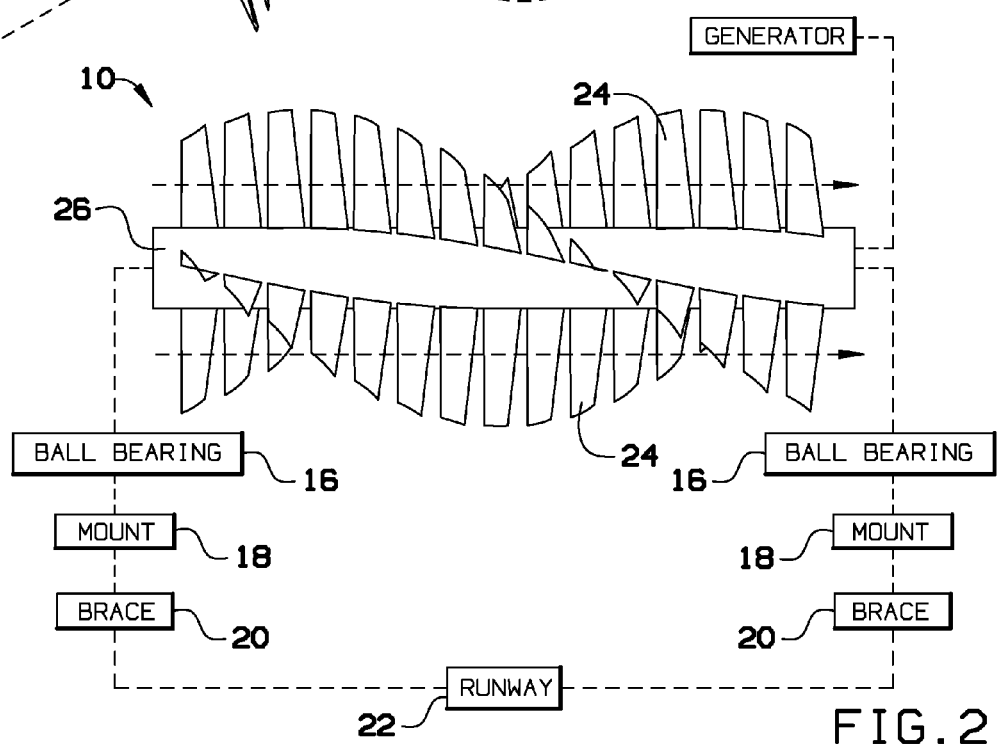
FIG. 2 is a schematic side view of the system of FIG. 1.

Referring now to FIGS. 1 and 2, a system 10 for generating electrical power according to an exemplary embodiment of the present invention may include a plurality of rotatably supported blades 24 disposed about a shaft 26. Each blade 24 may have a geometrical shape, for example, a rectangle, circle, or square. The blades 24 may be made of various materials, for example, aluminum, steel, plastic, composite, or the like.

A first rotational bearing 16 may be attached to a first end of the shaft 26. A second rotational bearing 16 may be attached to a second end of the shaft 26. A generator may be rotationally connected to the shaft 26 such that when the shaft 26 rotates, an input shaft (not shown) of the generator can be turned. In some embodiments, a gear box (not shown) can be disposed between the shaft 26 and the generator to provide turning of the input shaft of the desired in a desirable speed range. In some embodiments, a flywheel (not shown) can be attached to the shaft 26 to store momentum in the turning shaft 26 due to a burst of wind from an aircraft departure and allow the shaft 26 to continue to turn after the burst of wind is finished.

A first mounting device 18 may be connected to the second end of the shaft 26. A second mounting device 18 may be connected to the first end of the shaft 26. Braces, such as brackets 20 may be connected to the mounting devices 18 to help to secure the system 10 to a blast pad (not shown) behind a runway threshold (not shown) of a runway 22.

A user (not shown) may place the system 10 behind the runway 22 to collect the wasted energy from the aircraft. The user may firmly mount the brackets 20 onto the blast pad (not shown) of the runway 22 with the center line of the shaft 26 generally parallel to the center line of the runway 22. When the aircraft departs, the wind from their engines may move the blades 24, turning the shaft 26, which may spin the generator. The generator may be connected to an electrical device (not shown) or to a battery bank (not shown).

The blades 24 can be formed in various shapes and sizes. In some embodiments, the blades 24 can be formed by cutting an Archimedes screw into rectangular blades, for example.

It should be understood, of course, that the foregoing relates to exemplary embodiments of the invention and that modifications may be made without departing from the spirit and scope of the invention as set forth in the following claims.

What is claimed is:

1. A system for generation of electricity, comprising:
   a shaft comprising a first end opposite a second end, the shaft aligned parallel to a longitudinal axis of an aircraft runway;
   a plurality of blade rows helically extending from the first end to the second end of the shaft forming an Archimedes screw shape, wherein each blade row comprises a plurality of blades; and
   a generator mechanically coupled to the shaft, wherein turning of the shaft turns the generator to generate electricity.

2. The system of claim 1, wherein the plurality of blades are rectangular blades.

3. The system of claim 1, further comprising bearings on the first end and the second end of the shaft.

4. The system of claim 3, further comprising mounts attached to the bearings.

5. The system of claim 4, further comprising braces for connecting the mounts to a location on a blast pad of the aircraft runway.

6. A system for generating electrical power from exhaust wind of an airplane during takeoff, comprising:
- a plurality of rotatably supported blade rows helically disposed around a shaft forming an Archimedes screw shape, wherein each blade row comprises a plurality of blades;
- a first rotational bearing attached to a first end of the shaft;
- a second rotational bearing attached to a second end of the shaft;
- a generator connected to the shaft;
- a first mounting device connected to a second end of the shaft;
- a second mounting device connected to a first end of the shaft;
- a bracket connected to the first and second mounting devices, wherein the brackets are designed to be secured to a blast pad of a runway threshold, wherein the shaft is aligned parallel to a longitudinal axis of an aircraft runway.

7. The system of claim 6, wherein the plurality of blades are rectangular blades.

* * * * *